UNITED STATES PATENT OFFICE.

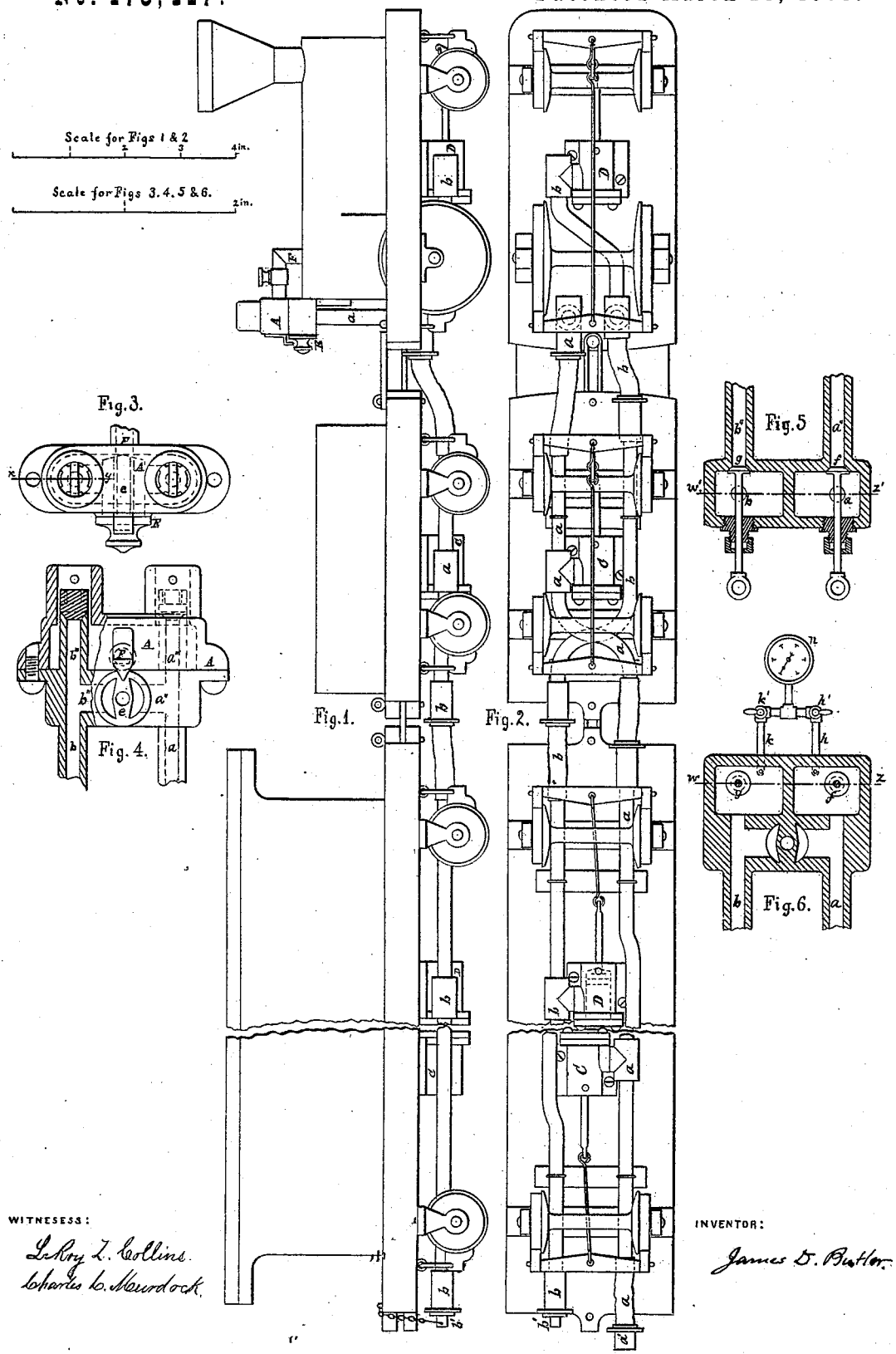

JAMES D. BUTLER, OF LANCASTER, MASSACHUSETTS.

IMPROVEMENT IN RAILROAD-TRAIN BRAKES.

Specification forming part of Letters Patent No. 175,417, dated March 28, 1876; application filed August 25, 1875.

*To all whom it may concern:*

Be it known that I, JAMES D. BUTLER, of Lancaster, Massachusetts, have invented a Railroad-Train Brake, of which the following is a specification:

My invention refers to the class of railroad-train brakes operated by the alternate supply to, and withdrawal from, the brake-pressure cylinders or their equivalents, of air or other fluid, through pipes communicating with these pressure-cylinders or their equivalents. By a novel arrangement and construction of some of these parts I am enabled to reduce the disastrous effects of the uncoupling of any of the pipes, or of rupture in the pipes or cylinders.

Figure 1 is a side elevation of a train embodying my invention. Fig. 2 is a bottom view of the same. Fig. 3 is a detached top view of the part A in Fig. 1, and its connections. Fig. 4 is a part side view of the same, and a part sectional view through line $x\,y$ of Fig. 3. Fig. 5 is a sectional plan through line $w\,z$ of Fig. 6, of a modified form of part of my invention. Fig. 6 is a sectional elevation of the same through line $w'\,z'$ of Fig. 5.

In the drawings, $a$ is a line of pipe through the train, communicating with the brake-cylinders C, and $b$ is another line of pipe communicating with the brake-cylinders D. The rear end of the line of pipe $a$ is closed by a plug, $a'$, and that of pipe $b$ by a cap, $b'$. The pipes $a$ and $b$ open respectively into the chambers $a''$ and $b''$, at their front ends. From these chambers $a''$ and $b''$ run the pipes $a'''$ and $b'''$ respectively. These pipes form a part of the ejectors heretofore used for vacuum-brakes, and by the admission of the steam into the chamber A, and its discharge around the pipes $a'''$ and $b'''$, the air is exhausted in the usual way from these pipes and from the chambers $a''$ and $b''$, and also from the cylinders C and D through the pipes $a$ and $b$.

In the system heretofore used the lines of pipe $a$ and $b$ have been connected at one or more points. It has therefore happened that if any opening of the pipes or cylinders occurs throughout the train the whole apparatus is inoperative, and the brakes will not hold at all.

In my invention, the two lines of pipe and their attachments are entirely separate, so as to operate independently. Then, even if one fails completely, the other remains unimpaired in its working, and holds its part of the train perfectly.

When both parts are in working order, their simultaneous action gives the same result as if they were connected, so that nothing is lost in the regular working of the whole by the division into two parts, while much is gained when anything in the one line gives out, by the continued operation of the other line.

The chambers $a''$ and $b''$, with which the pipes $a$ and $b$ respectively communicate, have heretofore been one, and through this chamber these pipes have been connected with each other. I introduce between these two chambers the partition $e$, thus shutting off the communication between the pipes at this point. The air-valve E makes a joint with the edge of this partition, and the opening of this valve admits air to both pipes $a$ and $b$, as heretofore.

The two lines of pipe have also been usually coupled together at the rear of the train, though where valves have been made in the couplings, it has not been necessary that this should be done; but I close the end of each line by attaching blank couplings through which there is no opening. These blank couplings seem to me to be better than valves in the regular couplings, because they are less delicate and less likely to leak, and also because they do not offer any obstruction to the flow of the fluid through the pipes, since they must be entirely withdrawn before the pipes are coupled with those of another car in making up the train. If, however, valves in the couplings shall be used, they will answer the same general purpose.

It will be seen that upon the engine and tender I use but one cylinder for operating both brakes, while upon the car I use two, each working but one brake. It is unimportant which form is used; but where only one cylinder is employed for each car, it is necessary that the two lines of pipe should cross each other under each car.

Only one of the lines of pipe can open into each cylinder, because if both opened into any one chamber, they would then be in communication with each other through such chamber; and if the pipes did not cross under each car, it might happen that the different cars brought together in making up a train should all have their cylinders connected with the same line of pipe—either the one on the right or that on the left side of the cars. In this case the operation of the brake would depend upon the working of this single line of pipe, while the other line would be entirely useless. It might be, however, that part of the cars on any particular railroad should have their cylinders attached to the right-hand pipes, and part to the left-hand ones; but then the equal division of the work between the two lines of pipe would require that as many cars with the left-hand attachment of cylinder be taken in the train as of those with the right-hand attachment. It is obvious that such a selection of cars would be entirely impracticable.

Now, the crossing of the pipes under each car secures the connection of each line with the cylinders of the alternate cars, and thus makes an equal division of the work between the two lines throughout the train. How this is accomplished will be made plain if we follow the lines of pipes from car to car. We shall see that the pipe which at one end of a car is on the left side of the center line is at the other end on the right side of this line. This pipe couples with that on the next car, which passes from the right to the left side, and it with another passing from left to right, and so on through the train; therefore each entire line of pipe being composed of the sections attached to each car runs zigzag through the train, first from right to left, and then from left to right.

If the cylinders be attached, for instance, to those pipes exclusively which cross from left to right under each car, then as half of these sections belong to one of the through-lines, and the other half to the other one, it is plain that each through-line will reach and operate half of the cylinders, and that the work will be equally divided between the two. Then, if one line fails utterly, the other one will secure the operation of the brakes on every alternate car in the train. It is therefore plain that the crossing of the pipes is a very important feature in the arrangement for the use of one brake-cylinder for each car, and two distinct lines of pipes.

Where two cylinders are used upon each car—one being connected with one line of pipe and the other with the other line—there is no occasion for the crossing of the pipes. The failure of one line will leave the other to operate half the brakes of every car.

It will be seen that the single steam-pipe F is used for supplying the steam for operating both ejectors, and that the same valve E is opened for the admission of the air to both chambers $a''$ and $b''$. It is hardly necessary to explain that the two ejectors may, if desired, be made entirely distinct, having separate steam-pipes and air-valves.

Instead of drawing the air from the pipes and cylinders by means of ejectors, it may be done through valves opening into chambers from which the air has been previously exhausted by pumps, or in any other convenient way. Thus, in Figs. 5 and 6, let $a^4$ be a pipe opening into an exhausted receiver, and $b^4$ another pipe opening into another exhausted receiver. When the valve $f$ is lifted the air or other fluid rushes from pipe $a$ and cylinders C into the receiver, and when $g$ is lifted it rushes from $b$ and D into the other receiver.

This invention applies equally to the arrangement in which the brakes are put on by pressure within the pipes and cylinders, instead of by exhausting from within these pipes and cylinders. The modification in the construction of parts which would be required is too obvious to need especial description; and it will answer to have the pipes and cylinders filled with any convenient fluid or liquid, such as water or oil, instead of with air.

Instead of cylinders and pistons for operating the brakes, it will answer to use bellows, such as are employed on many cars at present in use. The bellows may be considered as the equivalent of the cylinder and piston.

The gage $n$ communicates with one of the chambers by the pipe $h$, and with the other by the pipe $k$. The cocks $h'$ and $k'$ are supposed to be opened, as shown. In this case there is a connection between the two chambers and the two lines of pipes $a$ and $b$, through the pipes $h$ and $k$. This communication tends to produce an equalizing of the pressure in the two lines of pipe running through the train, and in the brake-cylinders connected with them; but when it becomes desirable to separate the two lines, the engineman has only to close either of the cocks $h'$ and $k'$. The gage gives the pressure for either line of pipes and cylinders, according as one or the other of the two cocks is opened.

I claim—

1. The combination, on each car, of two pipes crossing each other, and a brake-cylinder connected with one of said pipes, so that the cylinders of adjoining cars will be operated through different pipes, substantially as and for the purpose set forth.

2. The line of pipes throughout the train, separated into two distinct parts having no communication with each other, one of which connects with the cylinders or their equivalents, for operating part of the brakes of the train, and the other with the cylinders or their equivalents, for operating the remaining brakes.

3. The separate exhaust-chambers $a''$ and $b''$, and the ejector-pipes $a'''$ and $b'''$, in combination with the pipes $a$, which communicate with the brake-cylinders operating part of the brakes in the train, and with the pipes $b$, which communicate with the cylinders which operate the remaining brakes, or their equivalent, substantially as and for the purposes set forth.

4. In a double ejector for a vacuum-brake apparatus, the chest $a'' b''$, with the partition $e$, substantially as and for the purposes described.

JAMES D. BUTLER.

Witnesses:
LE ROY Z. COLLINS,
CHARLES C. MURDOCK.